US007321675B2

(12) United States Patent
Shinbata

(10) Patent No.: US 7,321,675 B2
(45) Date of Patent: Jan. 22, 2008

(54) IMAGE PROCESSING APPARATUS, IMAGE PROCESSING METHOD, STORAGE MEDIUM AND PROGRAM

(75) Inventor: Hiroyuki Shinbata, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 769 days.

(21) Appl. No.: 10/712,554

(22) Filed: Nov. 12, 2003

(65) Prior Publication Data

US 2004/0101187 A1 May 27, 2004

(30) Foreign Application Priority Data

Nov. 21, 2002 (JP) ............................. 2002-338188

(51) Int. Cl.
*G06K 9/00* (2006.01)

(52) U.S. Cl. ....................... 382/128; 382/132; 382/282

(58) Field of Classification Search ................ 378/154, 378/209, 54; 382/282, 128, 132
See application file for complete search history.

(56) References Cited

U.S. PATENT DOCUMENTS

| | | | | |
|---|---|---|---|---|
| 5,588,071 | A * | 12/1996 | Schultz | 382/168 |
| 5,995,108 | A * | 11/1999 | Isobe et al. | 345/421 |
| 6,031,892 | A * | 2/2000 | Karellas | 378/98.3 |
| 2002/0114504 | A1 * | 8/2002 | Shinbata | 382/132 |

* cited by examiner

*Primary Examiner*—Matthew C. Bella
*Assistant Examiner*—Claire Wang
(74) *Attorney, Agent, or Firm*—Morgan & Finnegan, LLP

(57) ABSTRACT

Processing of sorting a train of pixel values within the same line of a radiation image containing a gas part region or an air part region in a subject and rearranging the train of pixel values within the same line from the pixels having higher pixel values to the pixels having lower pixel values, is executed over the entire image of the subject. A characteristic value is calculated from a predetermined region of the image subjected to the sorting processing.

3 Claims, 2 Drawing Sheets

IMAGE PROCESSING APPARATUS, IMAGE PROCESSING METHOD, STORAGE MEDIUM AND PROGRAM

BACKGROUND OF THE INVENTION

1. Field of the Invention

The present invention relates generally to an image processing apparatus for extracting a characteristic value for a transformation of gradation, and more particularly to an image processing apparatus for extracting the characteristic value from an image in which pixel values are rearranged based on magnitudes of the pixel values.

2. Related Background Art

In a case where data obtained from photographing by some photographing apparatus such as a sensor, a camera, etc. are displayed on a monitor screen, an X-ray diagnosis film, etc., it is general that the photographed data are subjected to some gradation transformation, wherein the acquired data are converted into easy-to-observe density values. For example, FIGS. 3A and 3B are views schematically showing a radiation image of the abdomen, wherein the numeral 301 represents a spinal region, the numeral 302 denotes a gas generated in the abdomen, and the numeral 303 indicates a region from which a characteristic value for the gradation transformation is extracted. The characteristic value has hitherto been calculated from pixel values in the region 304, and the gradation transformation has been conducted based on this characteristic value.

There might be, however, a case where a gas assuming a complicated configuration is produced in the abdomen, and this gas region extends over the region for calculating the characteristic value for the gradation transformation. Such being the case, a magnitude of the characteristic value might largely differ depending on a case where the gas extends over the region for calculating the characteristic value and on a case where it does not. A problem arises from this, wherein a scatter in density of the image after the gradation transformation occurs.

What has been described so far is how the prior art is, and it is therefore desired to provide an image processing apparatus capable of stably performing the gradation transformation of an object image with a high accuracy.

SUMMARY OF THE INVENTION

It is a primary object of the present invention, which was devised to obviate the aforementioned problems inherent in the prior arts, to provide an image processing apparatus comprised of sorting means for executing sorting processing of sorting a train of pixel values within the same line of a radiation image and thus rearranging the train of pixel values within the same line from pixels having higher pixel values to pixels having lower pixel values, analyzing means for calculating a characteristic value from a predetermined region of the image after the sorting processing, and gradation transforming means for executing gradation transformation processing of the radiation image based on the characteristic value.

Other features and advantages of the present invention will be apparent from the following descriptions taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention, and together with the descriptions, serve to explain the principle of the invention, in which.

DESCRIPTION OF THE PREFERRED EMBODIMENTS

A preferred embodiment of the present invention will be described in detail in accordance with the accompanying drawings.

(Embodiment 1)

Figure 1:
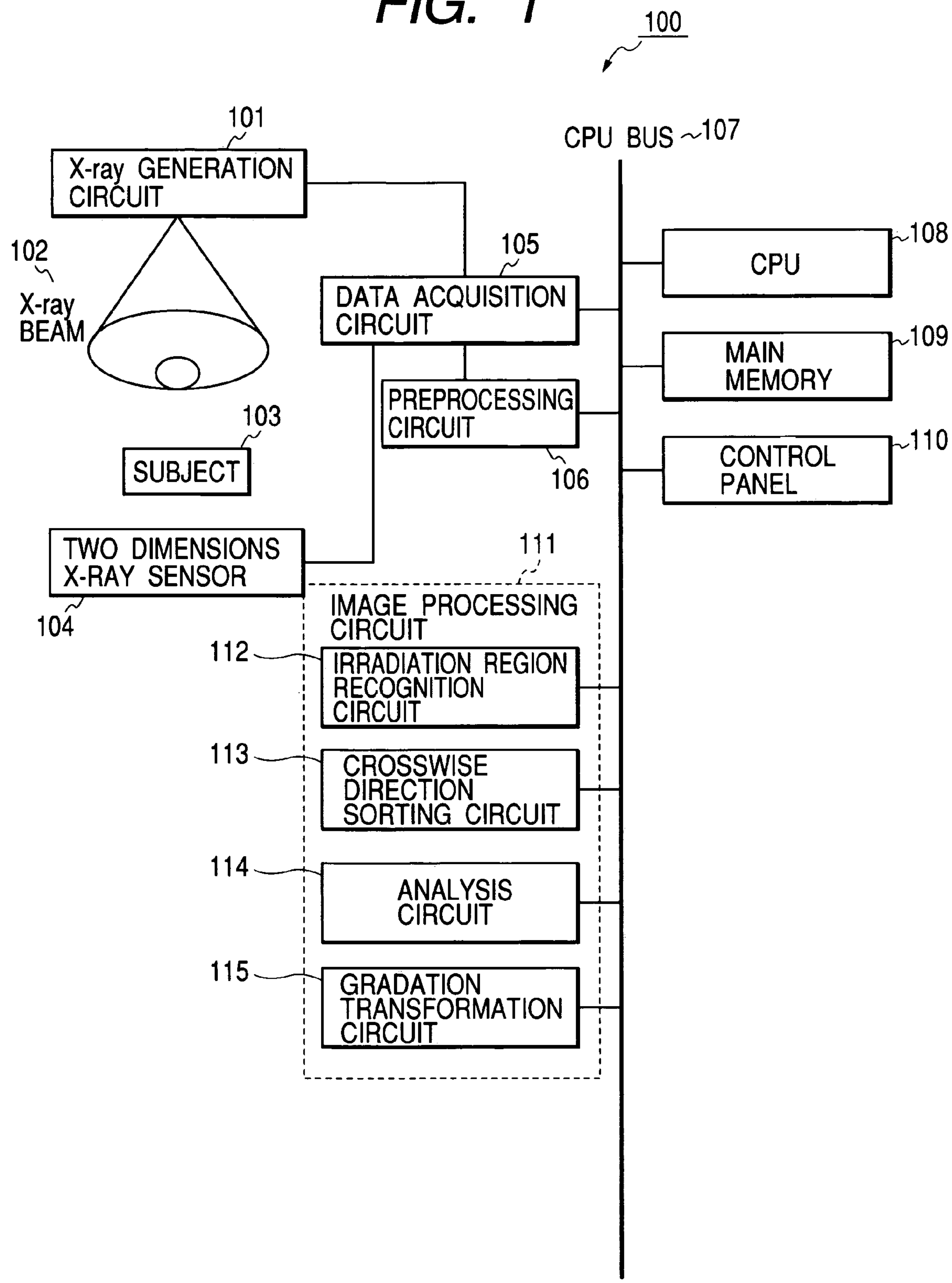
FIG. 1 is a block diagram showing a construction of an embodiment 1 of the present invention.

FIG. 1 shows an X-ray photographing apparatus 100 according to an embodiment 1 of the present invention. Namely, the X-ray photographing apparatus 100 is an X-ray photographing apparatus having an image processing function. The X-ray photographing apparatus 100 includes a preprocessing circuit 106, a CPU 108, a main memory 109, a control panel 110 and an image processing circuit 111, wherein pieces of data are transferred to and received from each other via a CPU bus 107.

Further, the X-ray photographing apparatus 100 includes a data acquisition circuit 105 connected to the preprocessing circuit 106, a two-dimensions X-ray sensor 104 connected to the data acquisition circuit 105, and an X-ray generation circuit 101, wherein these circuits are connected also to the CPU bus 107.

In the thus constructed X-ray photographing apparatus 100, to begin with, the main memory 109 is stored with various categories of data required for process in the CPU 108, and includes a work memory for operations of the CPU 108.

The CPU 108 controls the operations of the whole apparatus in accordance with control given from the control panel 110, and so forth. Under this control, the X-ray photographing apparatus 100 operates as follows.

To start with, the X-ray generation circuit 101 irradiates a subject 103 with X-ray beams 102.

The X-ray beams 102 irradiated from the X-ray generation circuit 101 penetrate the subject 103 while being attenuated, then reach the two-dimensions X-ray sensor 104, and are outputted as an X-ray image from the two-dimensions X-ray sensor 104. Herein, the X-ray image outputted from the two-dimensions X-ray sensor 104 is assumed to be a human body part image of, e.g., the abdomen, etc.

The data acquisition circuit 105 converts, into electric signals, the X-ray image outputted from the two-dimensions X-ray sensor 104 and supplied the converted electric signals to the preprocessing circuit 106. The preprocessing circuit 106 executes preprocessing such as offset correction processing, gain correction process, etc. on the signals (X-ray image signals) from the data acquisition circuit 105. The X-ray image signals having undergone the preprocessing in this preprocessing circuit 106 are transferred as an original image to the main memory 109 and to the image processing circuit 111 via the CPU bus 107 under the control of the CPU 108.

The numeral 111 represents a block diagram showing a construction of the image processing circuit, wherein the numeral 112 designates an irradiation region recognition circuit for extracting a region of the two-dimensions X-ray sensor 104, which is directly irradiated with X-rays, the numeral 113 denotes a crosswise direction sorting circuit for sorting a train of pixel values according to magnitudes of the pixel values within the same line of the image in the irradiated region extracted by the irradiation region recognition circuit 112, the numeral 114 represents an analysis circuit for calculating a characteristic value from a predetermined region of the image that have been subjected to the sorting processing in the crosswise direction sorting circuit 113, and the numeral 115 stands for a gradation transformation circuit for performing a gradation transformation of the original image on the basis of the characteristic value calculated by the analysis circuit 114.

Figure 2:
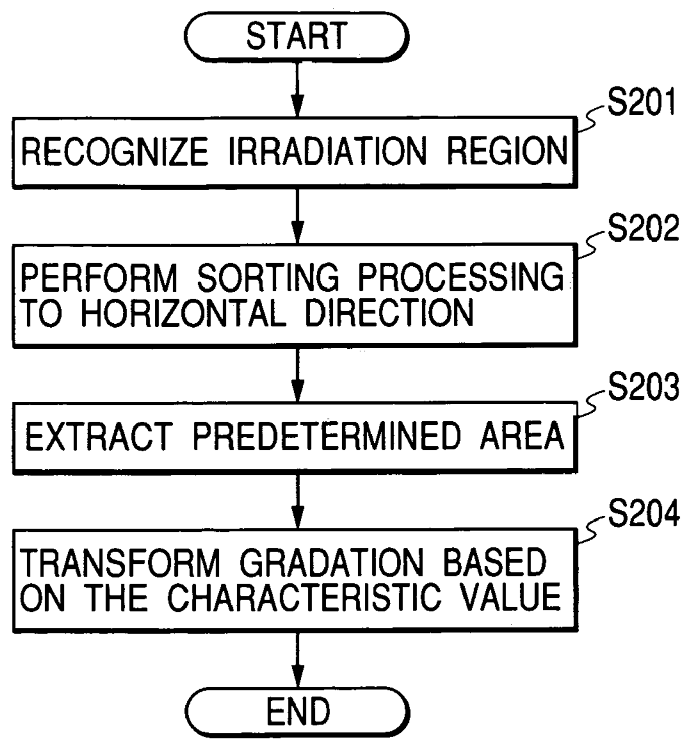
FIG. 2 is a flowchart showing a processing flow in the embodiment 1.
Figure 3A:
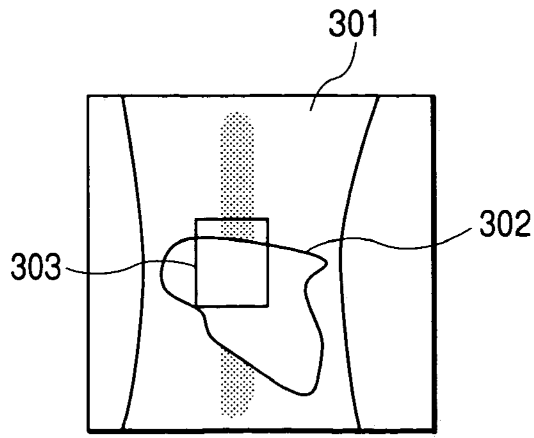
FIGS. 3A and 3B are views showing how an image of the abdomen is subjected to sorting processing.
Figure 3B:
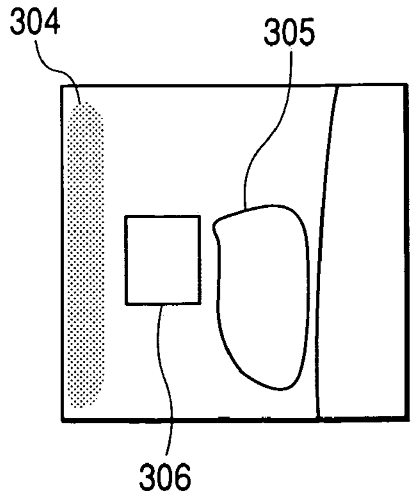

FIG. 2 is a flowchart showing a processing flow in the embodiment 1. FIG. 3A represents an image of the abdomen. FIG. 3B shows a view in which the sort process is executed outwards in the crosswise direction by the crosswise direction sorting circuit 114. In FIGS. 3A and 3B, the numeral 301 represents the spinal region, the numeral 302 denotes a gas generated in the abdomen, and the numeral 303 indicates a region from which the characteristic value for the gradation transformation is extracted. Similarly, in the image after the sorting processing, the numeral 304 represents the spinal region, the numeral 305 stands for a gas generated in the abdomen, and the numeral 303 indicates a region from which the characteristic value for the gradation transformation is extracted.

Next, an operation of the image processing circuit 111 will be explained in accordance with the processing flow in FIG. 2.

The irradiation region recognition circuit 112, which has received the input image processed by the preprocessing circuit 106 via the CPU bus 107 under the control of the CPU 108, extracts the irradiated region in the input image (step S201). In this case, a region excluding the irradiation region recognized by the irradiation region recognition circuit 112, is set as a zero (0) pixel value. Then, the crosswise direction sorting circuit 113 extracts a train of the pixel values from the same line of the image, and sorts the train of pixel values on the basis of the magnitudes of the pixel values. For instance, as in the image depicted in FIG. 3B, the pixel value train is sorted so that lower pixel values are disposed at a left end portion in the image (S202). Whatever methods may be taken as this sorting method as far as the sorting processing is generally applied. The crosswise direction sorting circuit 113 executes the sort process described above over the all the lines of the image. The 0 pixel value in the image is, however, set at the right end.

An image of limbs, a bone part region being poor of a transmissivity of the X-rays and resulting in a low pixel value, has a property that the pixel value increases towards a through-region from the bone part. Furthermore, the gas region has a tendency of exhibiting a high transmissivity of the X-rays and a high pixel value. Therefore, in the case of executing the sorting processing within the horizontal lines of the image, the bone part region defined as the low pixel value part concentrates at the left end portion of the image, while soft tissues proximal to the gas part region, viz., the through-region concentrates at the right end portion of the image. The same effect is exhibited also in an image of a chest part, etc., wherein an image of the spinal region concentrates at the left end, while an image of a lung field region and the through-region concentrate at the right end portion.

Thus, the value of the pixel value differs in accordance with anatomical parts (the bone part, the gas part, the soft part, etc.) of the subject, and hence the tissues and the gas part within the subject can be easily separated by executing the sorting processing (304 and 305 in FIGS. 3A and 3B). Moreover, even in a case where the subject is obliquely photographed, the separation of the gas part can be made with a stability without taking a posture of the subject into consideration.

Next, the analysis circuit 116 calculates a characteristic value such as an average value from a predetermined region (a square region 306 in FIGS. 3A and 3B) separated at a fixed distance from the left end portion in the image (S203). In this case, it is preferable that the fixed distance from the left end portion be given in the right side of the spinal region 304, and hence the gradation transformation circuit 115 makes a gradation transformation of the original image based on this characteristic value as well as on the general characteristic value of the spine (S204).

According to the embodiment 1, the image intra-line pixel values undergo the sorting processing, there is produced the effect enabling the spinal part region and the gas part region to be easily separated. Therefore, the gas part region can be removed from the region where the characteristic value for the gradation transformation is to be calculated, thereby yielding an effect of stabilizing the density of the image after the gradation transformation. Further, in the case of making use of only the image within the irradiation region, an effect is that the characteristic value can be stably calculated even when performing a narrow-down of the irradiation region without being affected by the low pixel value region outside the irradiation region. Furthermore, the region spaced at the fixed distance away from the end portion of the sorted image is set as the region where the characteristic value is to be calculated, thereby producing the effect that the characteristic value can be calculated from the region extending over neither the spinal region nor the gas region.

(Other Embodiment)

Note that the present invention may be applied to either a system constituted by a plurality of apparatuses (e.g., image processing apparatuses, interfaces, radiographic apparatuses, X-ray generation apparatuses, and the like) or an arrangement that integrates an image processing apparatus and a radiographic apparatus, or the like.

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiment, and the storage medium storing the program codes constitutes the invention.

Further, the storage medium, such as a floppy disk, a hard disk, an optical disk, a magneto-optical disk, CD-ROM, CD-R, a magnetic tape, a nonvolatile type memory card, and ROM can be used for providing the program codes.

Furthermore, besides aforesaid functions according to the above embodiment area realized by executing the program codes which are read by a computer, the present invention includes a case where an OS (operating system) or the like working on the computer performs a part or entire processes in accordance with designations of the program codes and realizes functions according to the above embodiment.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiment.

In a case where the present invention is applied to the aforesaid storage medium, the storage medium stores program codes corresponding to the flowchart shown in FIG. 2 described in the embodiment.

The present invention is not limited to the above embodiments and various changes and modifications can be made within the spirit and scope of the present invention. Therefore to apprise the public of the scope of the present invention, the following claims are made.

What is claimed is:

1. An image processing apparatus for gradation transformation processing of an abdominal image which includes a spinal region and a gas region, comprising:

first means for obtaining a processed image by sorting pixels of the abdominal image into an order from pixels having higher pixel values to pixels having lower pixel values;

second means for calculating a characteristic value from a predetermined region of the processed image; and gradation transforming means for executing gradation transformation processing of the abdominal image based on the characteristic value, wherein the predetermined region is set at a position apart from low-pixel-value-region side of the processed image by a distance corresponding to the spinal region.

2. The apparatus according to claim 1, further comprising:

irradiation region recognizing means for extracting an irradiation region from the abdominal image, wherein said first means executes the sorting of images within the extracted irradiation region.

3. The apparatus according to claim 1, further comprising:

radiation generating means for generating radiation; and image pickup means for picking up an abdominal image created by radiation transmitted through the abdomen of an object.

* * * * *